(12) United States Patent
He et al.

(10) Patent No.: US 10,027,899 B2
(45) Date of Patent: Jul. 17, 2018

(54) OPTICAL MODULE WITH VARIABLE LIGHT-TRANSMISSION AREA AND ELECTRONIC APPARATUS USING THE OPTICAL MODULE

(71) Applicant: Lenovo (Beijing) Co., Ltd., Beijing (CN)

(72) Inventors: Ke He, Beijing (CN); Jiefeng Chen, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/614,600

(22) Filed: Feb. 5, 2015

(65) Prior Publication Data

US 2016/0091739 A1    Mar. 31, 2016

(30) Foreign Application Priority Data

Sep. 29, 2014    (CN) .......................... 2014 1 0515915

(51) Int. Cl.
| | |
|---|---|
| H04N 5/225 | (2006.01) |
| H04N 5/235 | (2006.01) |
| G03B 9/02 | (2006.01) |
| G02B 26/02 | (2006.01) |
| G02B 5/00 | (2006.01) |
| G02B 26/04 | (2006.01) |

(52) U.S. Cl.
CPC .......... *H04N 5/2354* (2013.01); *G02B 5/005* (2013.01); *G02B 26/02* (2013.01); *G02B 26/04* (2013.01); *G03B 9/02* (2013.01)

(58) Field of Classification Search
CPC ......... G02F 1/137; H04N 5/2354; H04N 5/63
See application file for complete search history.

(56) References Cited

U.S. PATENT DOCUMENTS 9,307,158 B2 * 4/2016 Gleason .................. G02F 1/153
2011/0073752 A1    3/2011 Berkner et al.
(Continued)

FOREIGN PATENT DOCUMENTS

| CN | 101051161 A | 10/2007 |
|---|---|---|
| CN | 102736279 A | 10/2012 |

OTHER PUBLICATIONS

Office Action, and English language translation thereof, in corresponding Chinese Application No. 201410515915.6, dated Dec. 20, 2016, 19 pages.
(Continued)

*Primary Examiner* — Twyler Haskins
*Assistant Examiner* — Carramah J Quiett
(74) *Attorney, Agent, or Firm* — Brinks Gilson & Lione; John C. Freeman

(57) ABSTRACT

An optical module that achieves an adjustable aperture with a multilayer liquid crystal diaphragm, and an electronic apparatus using the optical module are described. The optical module includes at least one diaphragm layer having a light-transmission area that is fully transmissive and a variable light-transmission area filled with material having variable transmittance; and an electrode unit for applying an adjustment voltage to the at least one diaphragm layer. Transmittance of the variable light-transmission area varies in accordance with the adjustment voltage applied by the electrode unit.

6 Claims, 7 Drawing Sheets

(56) References Cited

U.S. PATENT DOCUMENTS

2013/0113988 A1* 5/2013 Wajs .................. H04N 5/225
 348/362
2014/0071317 A1 3/2014 Yamagata et al.

OTHER PUBLICATIONS

China Patent Office, Second Office Action from corresponding China Patent Application No. 201410515915.6 dated Sep. 1, 2017 (20 pages including English Translation).

* cited by examiner

OPTICAL MODULE WITH VARIABLE LIGHT-TRANSMISSION AREA AND ELECTRONIC APPARATUS USING THE OPTICAL MODULE

This application claims priority to Chinese patent application No. 201410515915.6 filed on Sep. 29, 2014, the entire contents of which are incorporated herein by reference.

BACKGROUND

The present application relates to the field of optical module, and more particularly to an optical module that achieves an adjustable aperture with a multilayer liquid crystal diaphragm, and an electronic apparatus using the optical module.

Electronic apparatus such as a smart cellphone typically has a camera section configured thereon for image capturing, such camera section usually only has a fixed aperture, which thereby limits exposure control and imaging quality for different exposure scenes. Although a conventional digital camera may have an adjustable aperture applied to different scenes, often its structure is very complex and its cost is high, so that it does not apply to electronic apparatus with a small size.

It is therefore desirable to provide an optical module and an electronic apparatus using the optical module, the optical module can achieve an adjustable aperture at low cost and with small size, thus obtaining better imaging quality and user experience.

SUMMARY

In view of the above, the present application provides an optical module and an electronic apparatus using the optical module.

According to an embodiment of the present application, there is provided an optical module, comprising: at least one diaphragm layer having a light-transmission area that is fully transmissive and a variable light-transmission area filled with material having variable transmittance; and an electrode unit for applying an adjustment voltage to the at least one diaphragm layer, wherein transmittance of the variable light-transmission area varies in accordance with the adjustment voltage applied by the electrode unit.

In addition, in the optical module according to an embodiment of the present application, wherein the light-transmission area is located in the center of the at least one diaphragm layer, the variable light-transmission area surrounds the light-transmission area.

In addition, in the optical module according to an embodiment of the present application, wherein when the adjustment voltage applied is greater than or equal to a predetermined threshold voltage, the variable light-transmission area is completely opaque.

In addition, in the optical module according to an embodiment of the present application, wherein the at least one diaphragm layer comprises a first diaphragm layer, a second diaphragm layer, and a third diaphragm layer, the first diaphragm layer, the second diaphragm layer, and the third diaphragm layer are arranged in order in a light entrance direction of the optical module with an optical axis as a center.

In addition, in the optical module according to an embodiment of the present application, wherein the first diaphragm layer has a first light-transmission area and a first variable light-transmission area, the second layer has a second light-transmission area and a second variable light-transmission area, and the third diaphragm layer has a third light-transmission area and a third variable light-transmission area, sizes of the first light-transmission area, the second light-transmission area, and the third light-transmission area are different from each other.

According to another embodiment of the present application, there is provided an optical module, comprising: a first diaphragm layer having a first light-transmission area that is fully transmissive and a first variable light-transmission area filled with material having variable transmittance; a second diaphragm layer having a second light-transmission area that is fully transmissive and a second variable light-transmission area filled with material having variable transmittance, the first diaphragm layer and the second diaphragm layer being arranged in order in a light entrance direction of the optical module with an optical axis as a center; an electrode unit for applying an adjustment voltage to the first diaphragm layer and the second diaphragm layer, wherein transmittance of the first variable light-transmission area and transmittance of the second variable light-transmission area vary in accordance with the adjustment voltage applied by the electrode unit.

According to another embodiment of the present application, there is provided an electronic apparatus, comprising: an optical system for forming an optical image of a subject; a signal processing system for converting the optical image into an image signal; a control system for controlling the optical system and the signal processing system to image the subject and obtain the image signal, wherein the optical system comprises an optical module for controlling an amount of light entering the optical system, and the optical module comprises at least one diaphragm layer having a light-transmission area that is fully transmissive and a variable light-transmission area filled with material having variable transmittance, and an electrode unit for applying an adjustment voltage to the at least one diaphragm layer, wherein transmittance of the variable light-transmission area varies in accordance with the adjustment voltage applied by the electrode unit.

In addition, in the electronic apparatus according to another embodiment of the present application, wherein the light-transmission area is located in the center of the at least one diaphragm layer, the variable light-transmission area surrounds the light-transmission area.

In addition, in the electronic apparatus according to another embodiment of the present application, when the adjustment voltage applied is greater than or equal to a predetermined threshold voltage, the variable light-transmission area is completely opaque.

In addition, in the electronic apparatus according to another embodiment of the present application, wherein the at least one diaphragm layer comprises a first diaphragm layer, a second diaphragm layer, and a third diaphragm layer, the first diaphragm layer, the second diaphragm layer, and the third diaphragm layer are arranged in order in a light entrance direction of the optical module with an optical axis as a center.

In addition, in the electronic apparatus according to another embodiment of the present application, wherein the first diaphragm layer has a first light-transmission area and a first variable light-transmission area, the second layer has a second light-transmission area and a second variable light-transmission area, and the third diaphragm layer has a third light-transmission area and a third variable light-transmission area, sizes of the first light-transmission area, the second light-transmission area, and the third light-transmission area are different from each other.

According to yet another embodiment of the present application, there is provided an electronic apparatus, comprising: an optical system for forming an optical image of a subject; a signal processing system for converting the optical image into an image signal; a control system for controlling the optical system and the signal processing system to image the subject and obtain the image signal, wherein the optical system comprises an optical module for controlling an amount of light entering the optical system, and the optical module comprises a first diaphragm layer having a first light-transmission area that is fully transmissive and a first variable light-transmission area filled with material having variable transmittance; a second diaphragm layer having a second light-transmission area that is fully transmissive and a second variable light-transmission area filled with material having variable transmittance, the first diaphragm layer and the second diaphragm layer being arranged in order in a light entrance direction of the optical module with an optical axis as a center; an electrode unit for applying an adjustment voltage to the first diaphragm layer and the second diaphragm layer, wherein transmittance of the first variable light-transmission area and transmittance of the second variable light-transmission area vary in accordance with the adjustment voltage applied by the electrode unit.

The optical module and the electronic apparatus using the optical module according to the embodiments of the present application can achieve an adjustable aperture at low cost and with small size, thus obtaining better imaging quality and user experience.

It is to be understood that both the foregoing general descriptions and the following detailed descriptions are exemplary and intended to provide further explanation of the claimed technique.

DETAILED DESCRIPTION

Hereinafter, a plurality of embodiments, applications, and modifications will be described with reference to the drawings. Further, embodiments described below are specific examples, and set with various technically preferable limitations, but the present application is not limited to these embodiments in the following description.

Figure 1:
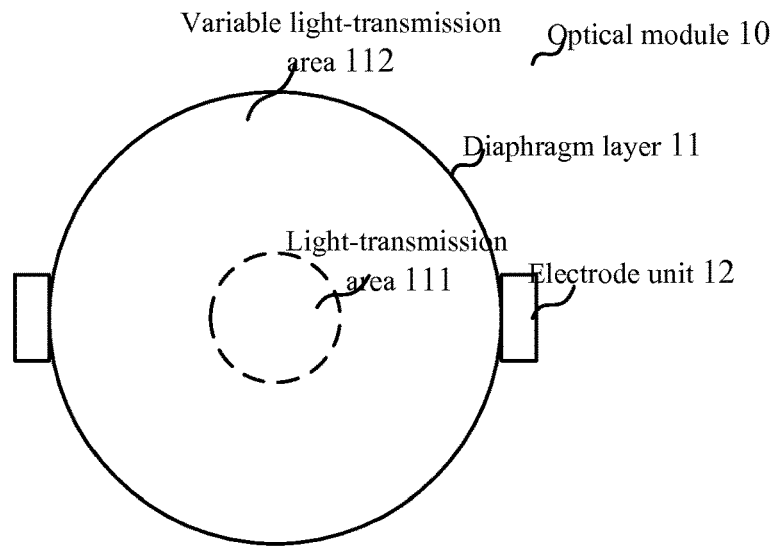
FIG. 1 is a schematic diagram illustrating a first example of the optical module according to an embodiment of the present application.

First, an optical module according to an embodiment of the present application will be described with reference to FIG. 1. As shown in FIG. 1, an optical module 10 according to an embodiment of the present application comprises a diaphragm layer 11 and an electrode unit 12.

In particular, the diaphragm layer 11 has a light-transmission area 111 that is fully transmissive and a variable light-transmission area 112 filled with material having variable transmittance. The light-transmission area 111 is located in the center of the diaphragm layer 11, the variable light-transmission area 112 surrounds the light-transmission area 111. The electrode unit 12 is for applying an adjustment voltage to the diaphragm layer 11.

In an embodiment of the present application, the material having variable transmittance is liquid crystal material. When the electrode unit 12 does not apply an adjustment voltage to the diaphragm layer 11, orientation of liquid crystal molecules in the variable light-transmission area 112 also changes, and as the adjustment voltage applied is boosted, transmittance of the variable light-transmission area 112 reduces correspondingly. When the adjustment voltage applied is greater than or equal to a predetermined threshold voltage, the variable light-transmission area becomes a completely opaque state. In this case, the diaphragm layer 11 will be in a state where the light-transmission area 111 located at the center of the diaphragm layer 11 is transmissive but the variable light-transmission area 112 that surrounds the light-transmission area 111 is completely opaque. When the variable light-transmission area 112 changes from a transmissive state in which no adjustment voltage is applied thereto to an opaque state in which a predetermined threshold voltage is applied thereto, an overall light transmittance of the diaphragm layer 11 also correspondingly experiences a transition from a maximum transmittance to a minimum transmittance.

Figure 2A:
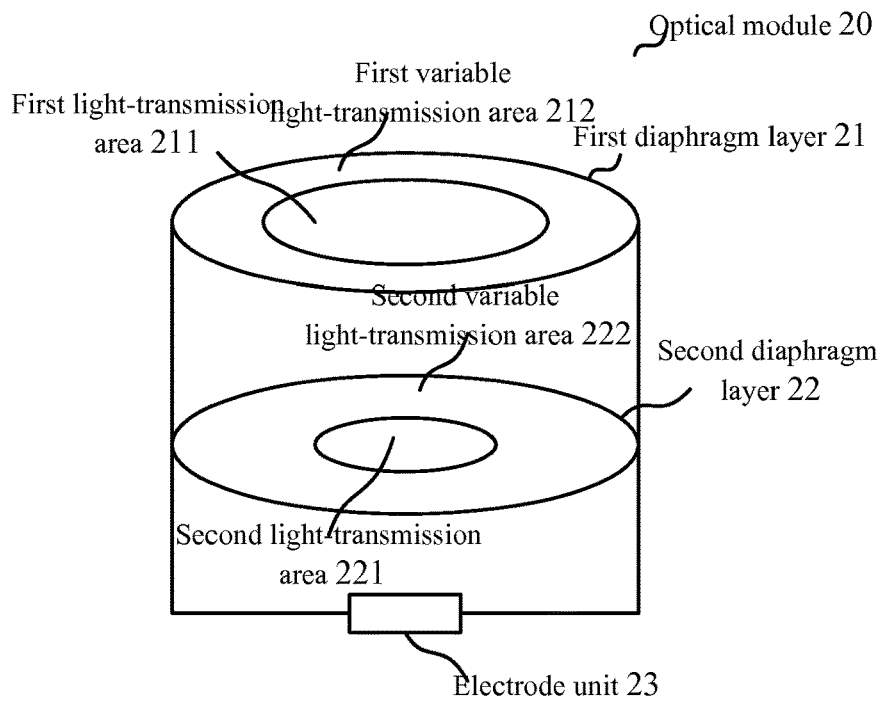
FIGS. 2A-2C are schematic diagrams illustrating a second example of the optical module according to an embodiment of the present application and its operation state.
Figure 2B:
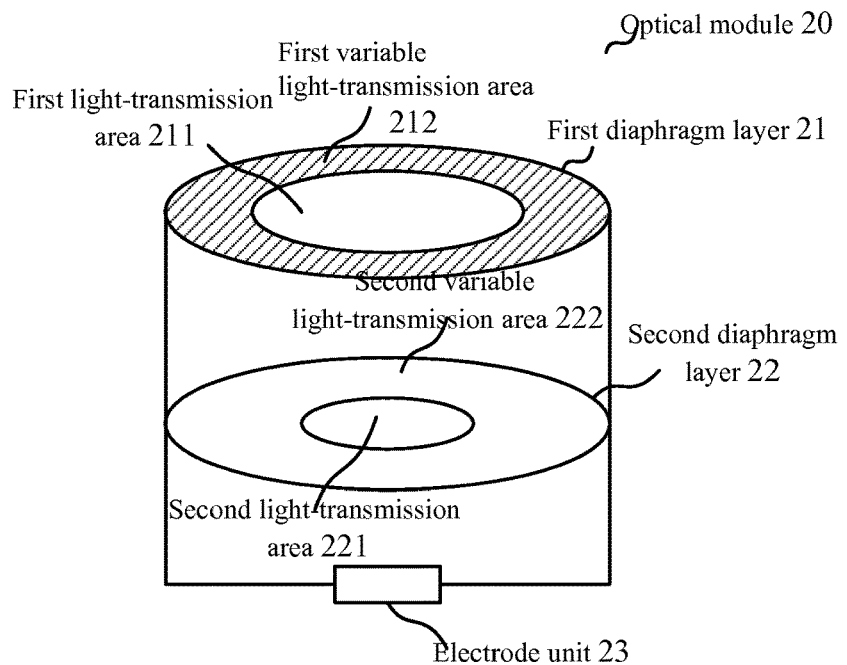
Figure 2C:
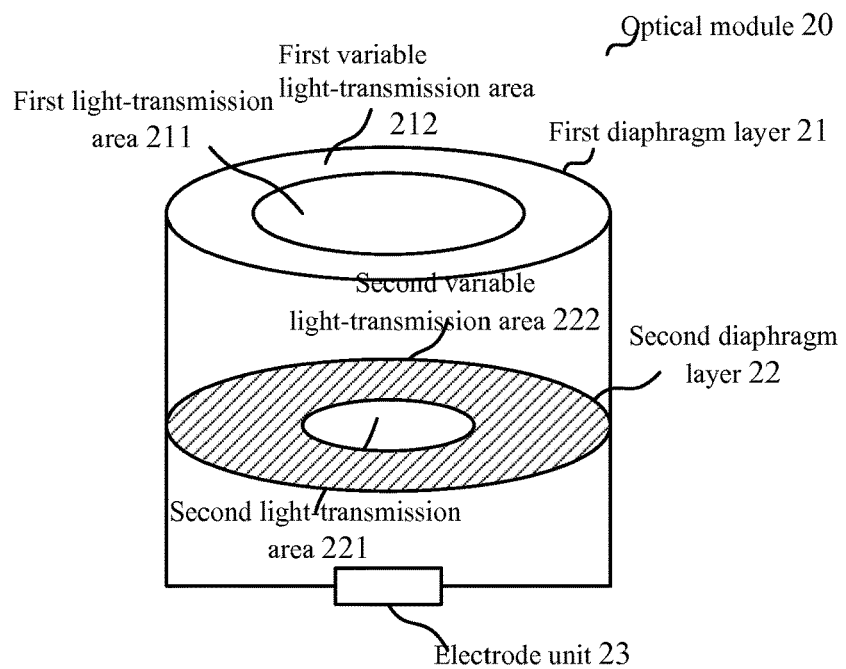

FIGS. 2A-2C are schematic diagrams illustrating a second example of the optical module according to an embodiment of the present application and its operation state. As shown in FIG. 2A, the optical module 20 according to an embodiment of the present application comprises two diaphragm layers. In particular, the optical module 20 comprises a first diaphragm layer 21, a second diaphragm layer 22, and an electrode unit 23. The first diaphragm layer 21 and the second diaphragm layer 22 are arranged in order in a light entrance direction of the optical module with an optical axis as a center. The electrode unit 23 is for applying an adjustment voltage to the first diaphragm layer 21 and the second diaphragm layer 22. The first diaphragm layer 21 has a first light-transmission area 211 that is fully transmissive and a first variable light-transmission area 212 filled with material having variable transmittance. The first light-transmission area 211 is located in the center of the first diaphragm layer 21, the first variable light-transmission area 212 surrounds the first light-transmission area 211. The second diaphragm layer 22 has a second light-transmission area 221 that is fully transmissive and a second variable light-transmission area 222 filled with material having variable transmittance. The second light-transmission area 221 is located in the center of the second diaphragm layer 22, the second variable light-transmission area 222 surrounds the second light-transmission area 221.

Similar to the variable light-transmission area 112 shown in FIG. 1, orientation of liquid crystal molecules in the first variable light-transmission area 212 and the second variable light-transmission area 222 in FIG. 2 also changes along with the adjustment voltage applied by the electrode unit 23. And as the adjustment voltage applied is boosted, transmittance of the first variable light-transmission area 212 and the second variable light-transmission area 222 reduces correspondingly. When the adjustment voltage applied is greater than or equal to a predetermined threshold voltage, the first variable light-transmission area 212 and the second variable light-transmission area 222 become a completely opaque state. The first variable light-transmission area 212 and the second variable light-transmission area 222 have different sizes. As shown in FIG. 2A, area of the first variable light-transmission area 212 is smaller than area of the second variable light-transmission area 222.

FIG. 2B further illustrates a first operation state of the optical module 20 in FIG. 2A. In the first operation state, the electrode unit 23 applies an adjustment voltage larger than or equal to a predetermined threshold voltage to the first diaphragm layer 21, so that the first variable light-transmission area 212 in the first diaphragm layer 21 is in an opaque state. Meanwhile, the electrode unit 23 does not apply an adjustment voltage to the second diaphragm layer 22. That is to say, the first diaphragm 21 is in a minimum transmittance state, and the second diaphragm layer 22 is in a maximum transmittance state, and transmittance of the optical module 20 is decided by transmittance of the first diaphragm layer 21.

FIG. 2C further illustrates a second operation state of the optical module 20 in FIG. 2A. In the second operation state, the electrode unit 23 applies an adjustment voltage larger than or equal to a predetermined threshold voltage to the second diaphragm layer 22, so that the second variable light-transmission area 222 in the second diaphragm layer 22 is in an opaque state. Meanwhile, the electrode unit 23 does not apply an adjustment voltage to the first diaphragm layer 21. That is to say, the first diaphragm 21 is in a maximum transmittance state, and the second diaphragm layer 22 is in a minimum transmittance state, and transmittance of the optical module 20 is decided by transmittance of the second diaphragm layer 22.

In the first and second operation states illustrated in FIGS. 2B and 2C, since area of the first variable light-transmission area 212 is smaller than area of the second variable light-transmission area 222, then an overall transmittance of the optical module 20 in the first operation state is higher than an overall transmittance of the optical module 20 in the second operation state.

Figure 3A:
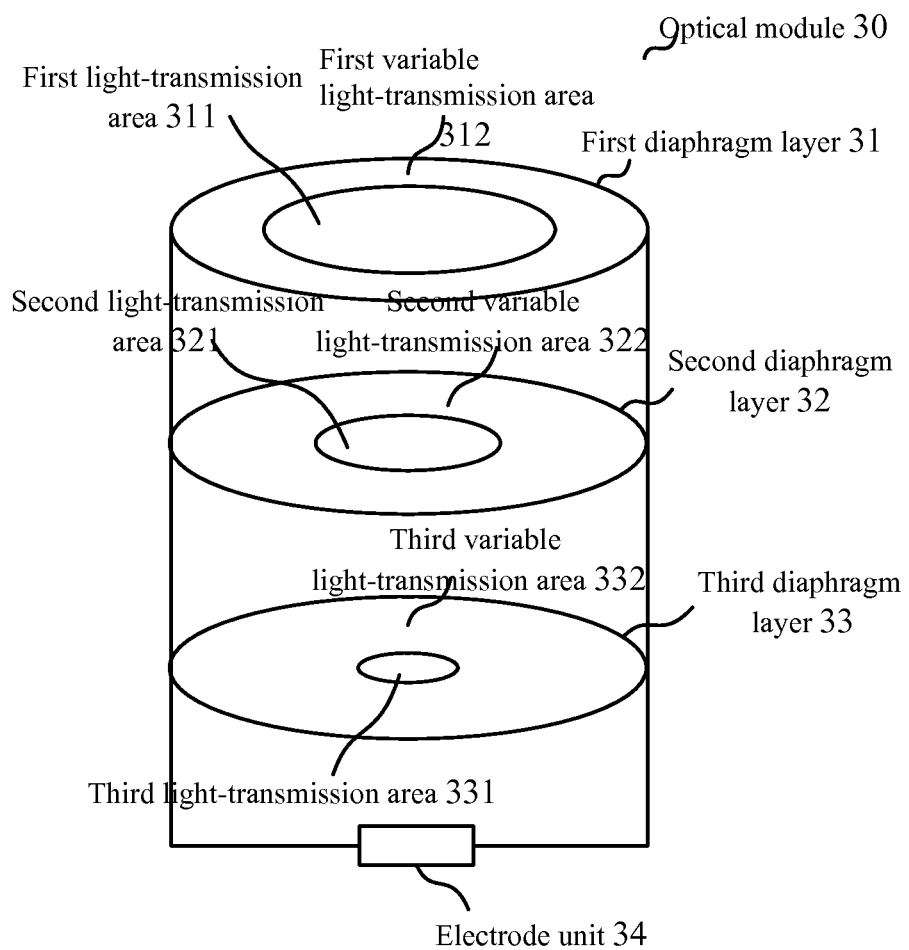
FIGS. 3A-3D are schematic diagrams illustrating a third example of the optical module according to an embodiment of the present application and its operation state.

FIGS. 3A-3D are schematic diagrams illustrating a third example of the optical module according to an embodiment of the present application and its operation state. As shown in FIG. 3A, the optical module 30 according to an embodiment of the present application comprises three diaphragm layers. In particular, the optical module 30 comprises a first diaphragm layer 31, a second diaphragm layer 32, a third diaphragm layer 33, and an electrode unit 34. The first diaphragm layer 31, the second diaphragm layer 32, and the third diaphragm layer 33 are arranged in order in a light entrance direction of the optical module 30 with an optical axis as a center. The electrode unit 34 is for applying an adjustment voltage to the first diaphragm layer 31, the second diaphragm layer 32, and the third diaphragm layer 33. The first diaphragm layer 31 has a first light-transmission area 311 that is fully transmissive and a first variable light-transmission area 312 filled with material having variable transmittance. The first light-transmission area 311 is located in the center of the first diaphragm layer 31, the first variable light-transmission area 312 surrounds the first light-transmission area 311. The second diaphragm layer 32 has a second light-transmission area 321 that is fully transmissive and a second variable light-transmission area 322 filled with material having variable transmittance. The second light-transmission area 321 is located in the center of the second diaphragm layer 32, the second variable light-transmission area 322 surrounds the second light-transmission area 321. The third diaphragm layer 33 has a third light-transmission area 331 that is fully transmissive and a third variable light-transmission area 332 filled with material having variable transmittance. The third light-transmission area 331 is located in the center of the second diaphragm layer 33, the third variable light-transmission area 332 surrounds the third light-transmission area 331.

Similar to the variable light-transmission area 112 shown in FIG. 1, orientation of liquid crystal molecules in the first variable light-transmission area 312, the second variable light-transmission area 322, and the third variable light-transmission area 332 in FIG. 3 also changes along with the adjustment voltage applied by the electrode unit 34. And as the adjustment voltage applied is boosted, transmittance of the first variable light-transmission area 312, the second variable light-transmission area 322, and the third variable light-transmission area 332 reduces correspondingly. When the adjustment voltage applied is greater than or equal to a predetermined threshold voltage, the first variable light-transmission area 312, the second variable light-transmission area 322, and the third light-transmission area 332 become a completely opaque state. The first variable light-transmission area 312, the second variable light-transmission area 322, and the third variable light-transmission area 332 have different sizes. As shown in FIG. 3A, area of the first variable light-transmission area 312 is smaller than area of the second variable light-transmission area 322, and area of the second variable light-transmission area 322 is smaller than area of the third variable light-transmission area 332.

Figure 3B:
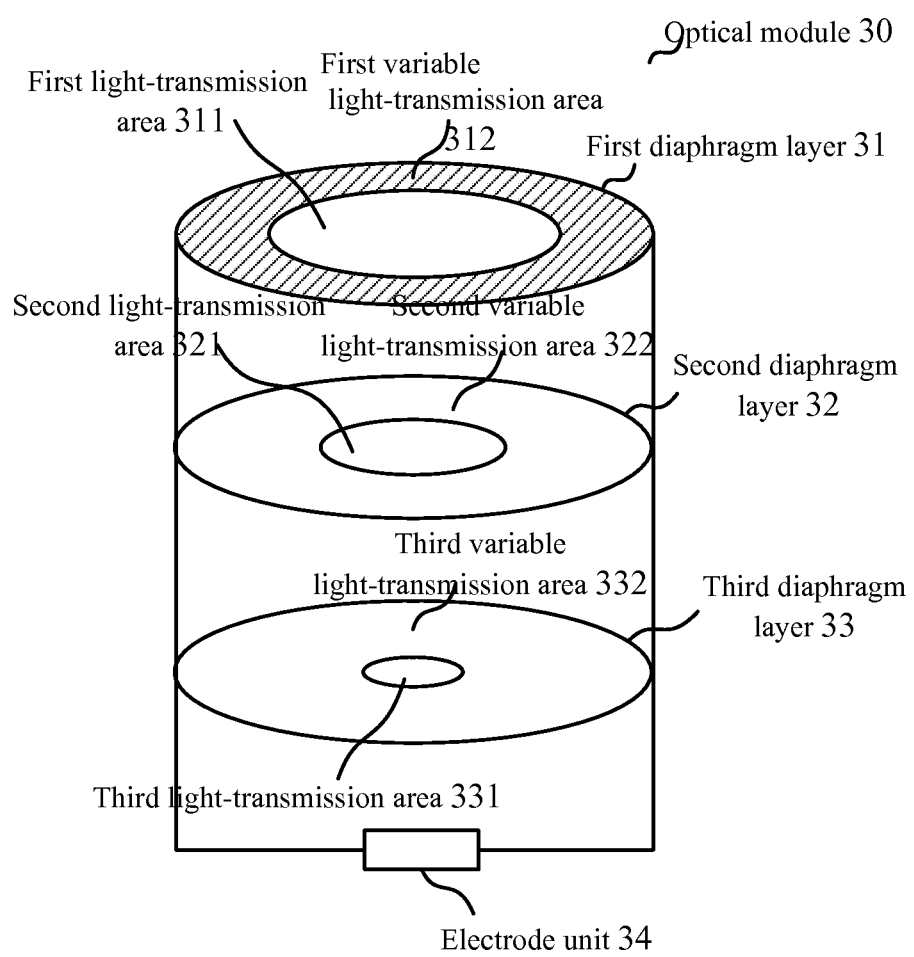

FIG. 3B further illustrates a first operation state of the optical module 30 in FIG. 3A. In the first operation state, the electrode unit 34 applies an adjustment voltage larger than or equal to a predetermined threshold voltage to the first diaphragm layer 31, so that the first variable light-transmission area 312 in the first diaphragm layer 31 is in an opaque state. Meanwhile, the electrode unit 34 does not apply an adjustment voltage to the second diaphragm layer 32 and the third diaphragm layer 33. That is to say, the first diaphragm 31 is in a minimum transmittance state, and the second diaphragm layer 32 and the third diaphragm layer 33 are in a maximum transmittance state, and transmittance of the optical module 30 is decided by transmittance of the first diaphragm layer 31.

Figure 3C:
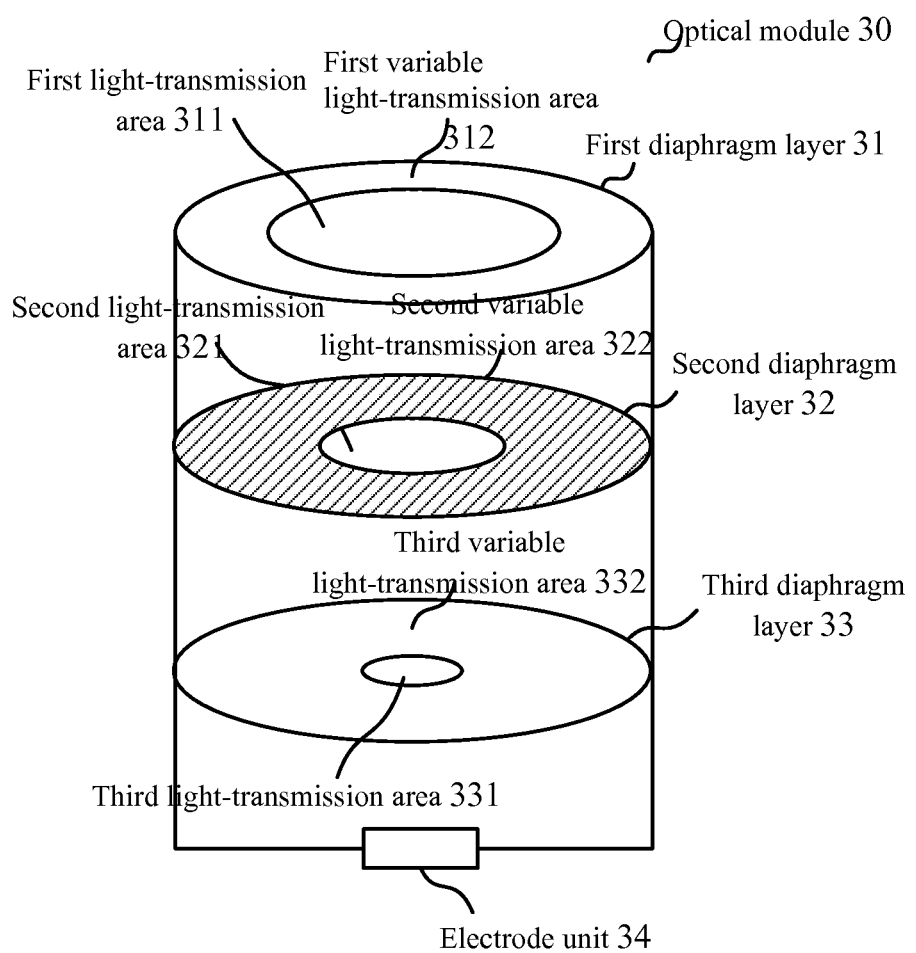

Likewise, FIG. 3C further illustrates a second operation state of the optical module 30 in FIG. 3A. In the second operation state, the electrode unit 34 applies an adjustment voltage larger than or equal to a predetermined threshold voltage to the second diaphragm layer 32, so that the second variable light-transmission area 322 in the second diaphragm layer 32 is in an opaque state. Meanwhile, the electrode unit 34 does not apply an adjustment voltage to the first diaphragm layer 31 and the third diaphragm layer 33. That is to say, the first diaphragm 31 and the third diaphragm layer 33 are in a maximum transmittance state, and the second diaphragm layer 32 is in a minimum transmittance state, and transmittance of the optical module 30 is decided by transmittance of the second diaphragm layer 32.

Figure 3D:
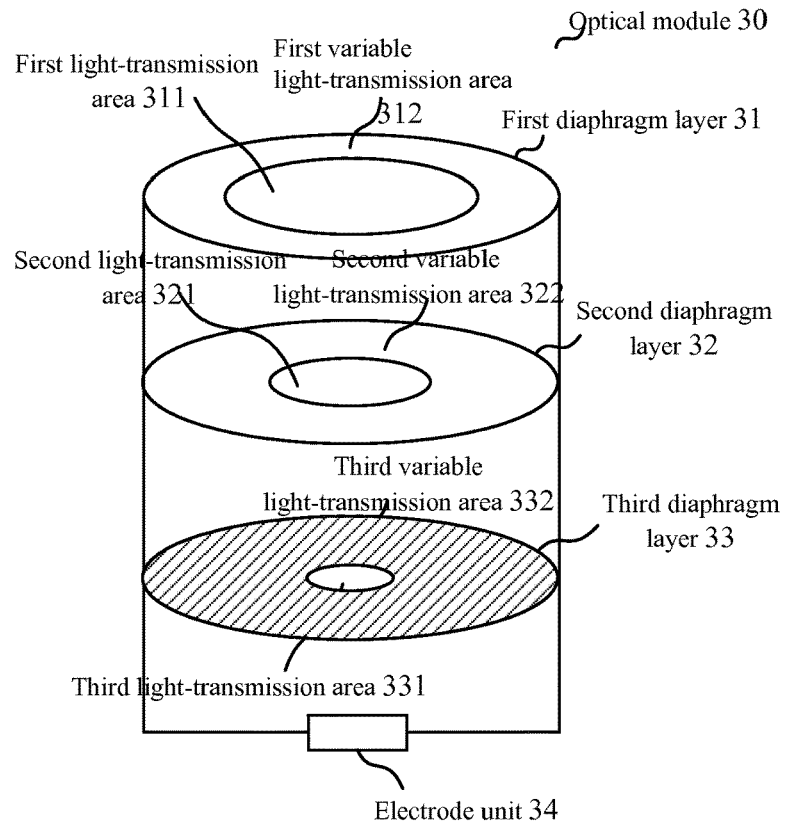

In addition, FIG. 3D further illustrates a third operation state of the optical module 30 in FIG. 3A. In the third operation state, the electrode unit 34 applies an adjustment voltage larger than or equal to a predetermined threshold voltage to the third diaphragm layer 33, so that the third variable light-transmission area 332 in the third diaphragm layer 33 is in an opaque state. Meanwhile, the electrode unit 34 does not apply an adjustment voltage to the first diaphragm layer 31 and the second diaphragm layer 32. That is to say, the first diaphragm 31 and the second diaphragm layer 32 are in a maximum transmittance state, and the third diaphragm layer 33 is in a minimum transmittance state, and transmittance of the optical module 30 is decided by transmittance of the third diaphragm layer 33.

From the first operation state to the third operation state illustrated in FIGS. 3B to 3D, since area of the first variable light-transmission area 312, area of the second variable light-transmission area 322, and area of the third variable light-transmission area 332 increase gradually, an overall transmittance of the optical module 30 decreases sequentially from the first operation state to the third operation state. For example, when the optical module 30 is used as an aperture-adjustment optical module in an electronic apparatus, the optical module 30 in the first operation state may provide a transmittance equivalent to F=1.8, and the optical module 30 in the second operation state may provide a transmittance equivalent to F=2.4, and the optical module 30 in the third operation state may provide a transmittance equivalent to F=3.6.

Figure 4:
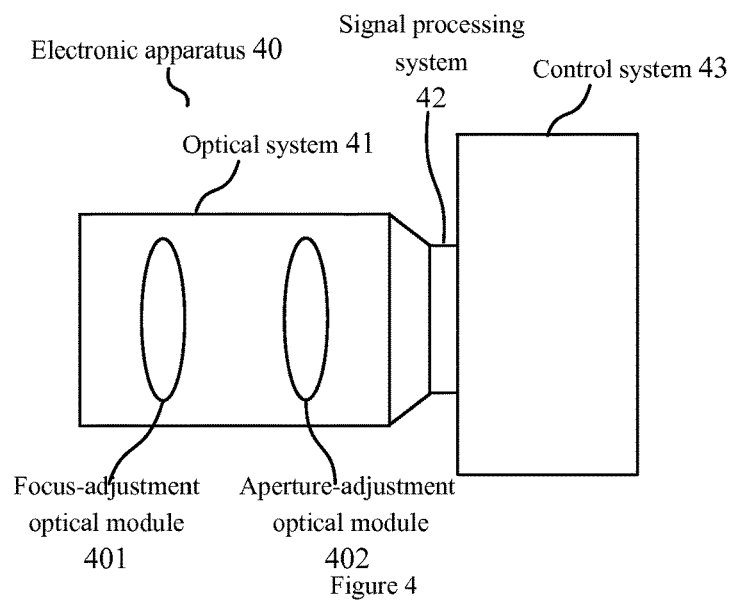
FIG. 4 is a schematic diagram illustrating the electronic apparatus according to an embodiment of the present application.

FIG. 4 is a schematic diagram illustrating the electronic apparatus according to an embodiment of the present application. As shown in FIG. 4, the electronic apparatus 40 according to an embodiment of the present application comprises an optical system 41 for forming an optical image of a subject; a signal processing system 42 for converting the optical image into an image signal; a control system for controlling the optical system 41 and the signal processing system 42 to image the subject and obtain the image signal. Further, the optical system 42 comprises a focus-adjustment optical module 401 and an aperture-adjustment optical module 402.

In particular, the focus-adjustment optical module 401 may be composed by lens groups consisting of a plurality of lenses, and is for performing focus adjustment of imaging automatically or manually by a user according to a control signal from the control system 43. The aperture-adjustment optical module 402 may be composed by the optical module described with reference to FIGS. 1 to 3D. For example, the aperture-adjustment optical module 402 may adopt a fixed aperture optical module with a single-layer diaphragm as shown in FIG. 1. Alternatively, the aperture-adjustment optical module 402 may adopt a variable aperture optical module with a double-layer or three-layer diaphragm as shown in FIG. 2A or 3A. In the case that the aperture-adjustment optical module 402 is a variable aperture optical module, it adjusts an adjustment voltage applied by the electrode unit in the aperture-adjustment optical module 402 to respective diaphragm layers, automatically or manually by a user according to a control signal from the control system 43, thus achieving a desired aperture value.

In addition, the signal processing system 42 comprises an image sensor unit such as a CCD or CMOS, and is for converting an optical image acquired by the optical system 41 into an image signal. The image signal is likely to experience image processing like A/D conversion, compression and so on, and thereafter is stored as image data.

In the electronic apparatus 40 described with reference to FIG. 4, the optical system 41 thereof adopts the optical module according to an embodiment of the present application as the aperture-adjustment optical module 402, in order to achieve the effect of an adjustable aperture at low cost and with small size.

Figure 5:
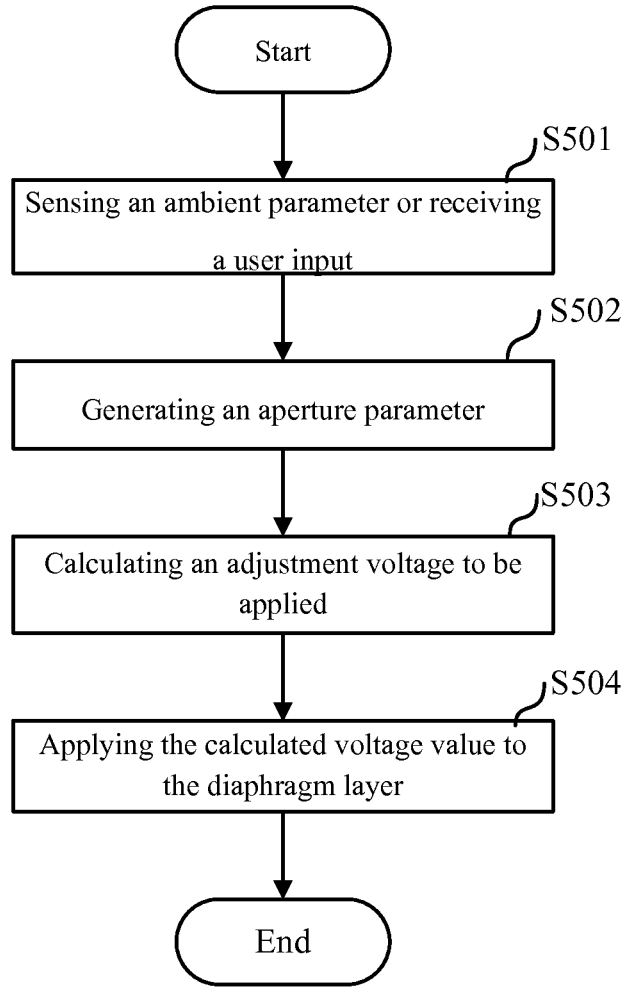
FIG. 5 is a flow chart illustrating the control over the optical module according to an embodiment of the present application.

FIG. 5 is a flow chart illustrating the control over the optical module according to an embodiment of the present application. As shown in FIG. 5, the method of controlling the optical module according to an embodiment of the present application comprises the following steps.

In step S501, an ambient parameter is sensed or a user input is received. The electronic apparatus provided with the optical module according to an embodiment of the present application may comprise an ambient light sensor module, which is for sensing an ambient light parameter. A control module of the electronic apparatus will automatically determine a desired aperture value based on the ambient light parameter sensed by the ambient light sensor module. Alternatively, the electronic apparatus may comprise a user command input module, by which the user directly inputs a specified aperture value. Thereafter, the processing proceeds to step S502.

In step S502, the control module of the electronic apparatus generates an aperture parameter of the optical module based on the aperture value. Thereafter, the processing proceeds to step S503.

In step S503, a dedicated microprocessor chip configured within the control module or the optical module of the electronic apparatus calculates an adjustment voltage to be applied to the diaphragm layer having a variable light-transmission area based on the generated aperture parameter. Thereafter, the processing proceeds to step S504.

In step S504, the electrode layer configured within the optical module applies the calculated voltage value to the diaphragm layer, such that the electronic apparatus achieves the desired aperture value.

In the above, the optical module and the electronic apparatus using the optical module according to the embodiments of the present application are described with reference to FIGS. 1 to 5, they can achieve an adjustable aperture at low cost and with small size, thus obtaining better imaging quality and user experience.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. An optical module comprising:
at least one diaphragm layer having a light-transmission area that is fully transmissive and a variable light-transmission area filled with material having variable transmittance; and
an electrode unit for applying an adjustment voltage to the at least one diaphragm layer,
wherein as the adjustment voltage applied by the electrode unit is boosted, transmittance of the variable light-transmission area correspondingly reduces and when the adjustment voltage applied is greater than or equal to a predetermined threshold voltage, the variable light-transmission area becomes a completely opaque state,
wherein the at least one diaphragm layer comprises a first diaphragm layer, a second diaphragm layer, and a third diaphragm layer, the first diaphragm layer, the second diaphragm layer, and the third diaphragm layer are arranged in order in a light entrance direction of the optical module with an optical axis as a center, and
the first diaphragm layer has a first light-transmission area and a first variable light-transmission area, the second layer has a second light-transmission area and a second variable light-transmission area, and the third diaphragm layer has a third light-transmission area and a third variable light-transmission area, sizes of the first light-transmission area, the second light-transmission area, and the third light-transmission area are different from each other.

2. The optical module of claim 1, wherein the light-transmission area is located in the center of the at least one diaphragm layer and the variable light-transmission area surrounds the light-transmission area.

3. An optical module, comprising:
a first diaphragm layer having a first light-transmission area that is fully transmissive and a first variable light-transmission area filled with material having variable transmittance;
a second diaphragm layer having a second light-transmission area that is fully transmissive and a second variable light-transmission area filled with material having variable transmittance, wherein the first diaphragm layer and the second diaphragm layer are arranged in order in a light entrance direction of the optical module with an optical axis as a center; and
an electrode unit for applying an adjustment voltage to the first diaphragm layer and the second diaphragm layer,
wherein transmittance of the first variable light-transmission area and transmittance of the second variable light-transmission area vary in accordance with the adjustment voltage applied by the electrode unit, and the first diaphragm layer has a first light-transmission area and a first variable light-transmission area, and the second layer has a second light-transmission area and a second variable light-transmission area, sizes of the first light-transmission area and the second light-transmission area are different from each other.

4. An electronic apparatus, comprising:
an optical system for forming an optical image of a subject;
a signal processing system for converting the optical image into an image signal;
a control system for controlling the optical system and the signal processing system to image the subject and obtain the image signal,
wherein the optical system comprises an optical module for controlling an amount of light entering the optical system, and the optical module comprises:
at least one diaphragm layer having a light-transmission area that is fully transmissive and a variable light-transmission area filled with material having variable transmittance; and
an electrode unit for applying an adjustment voltage to the at least one diaphragm layer,
wherein as the adjustment voltage applied by the electrode unit is boosted, transmittance of the variable light-transmission area correspondingly reduces and when the adjustment voltage applied is greater than or equal to a predetermined threshold voltage, the variable light-transmission area becomes a completely opaque state,
wherein the at least one diaphragm layer comprises a first diaphragm layer, a second diaphragm layer, and a third diaphragm layer, the first diaphragm layer, the second diaphragm layer, and the third diaphragm layer are arranged in order in a light entrance direction of the optical module with an optical axis as a center, and
the first diaphragm layer has a first light-transmission area and a first variable light-transmission area, the second layer has a second light-transmission area and a second variable light-transmission area, and the third diaphragm layer has a third light-transmission area and a third variable light-transmission area, sizes of the first light-transmission area, the second light-transmission area, and the third light-transmission area are different from each other.

5. The electronic apparatus of claim 4, wherein the light-transmission area is located in the center of the at least one diaphragm layer, and the variable light-transmission area surrounds the light-transmission area.

6. An electronic apparatus comprising:
an optical system for forming an optical image of a subject;
a signal processing system for converting the optical image into an image signal;
a control system for controlling the optical system and the signal processing system to image the subject and obtain the image signal,
wherein the optical system comprises an optical module for controlling an amount of light entering the optical system, and the optical module comprises:
a first diaphragm layer having a first light-transmission area that is fully transmissive and a first variable light-transmission area filled with material having variable transmittance;
a second diaphragm layer having a second light-transmission area that is fully transmissive and a second variable light-transmission area filled with material having variable transmittance, the first diaphragm layer and the second diaphragm layer being arranged in order in a light entrance direction of the optical module with an optical axis as a center;
an electrode unit for applying an adjustment voltage to the first diaphragm layer and the second diaphragm layer, wherein transmittance of the first variable light-transmission area and transmittance of the second variable light-transmission area vary in accordance with the adjustment voltage applied by the electrode unit, and the first diaphragm layer has a first light-transmission area and a first variable light-transmission area, and the second layer has a second light-transmission area and a second variable light-transmission area, sizes of the first light-transmission area and the second light-transmission area are different from each other.

* * * * *